June 28, 1955 O. D. CRUMP 2,711,624
MOWING ATTACHMENT FOR A TRACTOR
Filed July 2, 1954 3 Sheets-Sheet 1
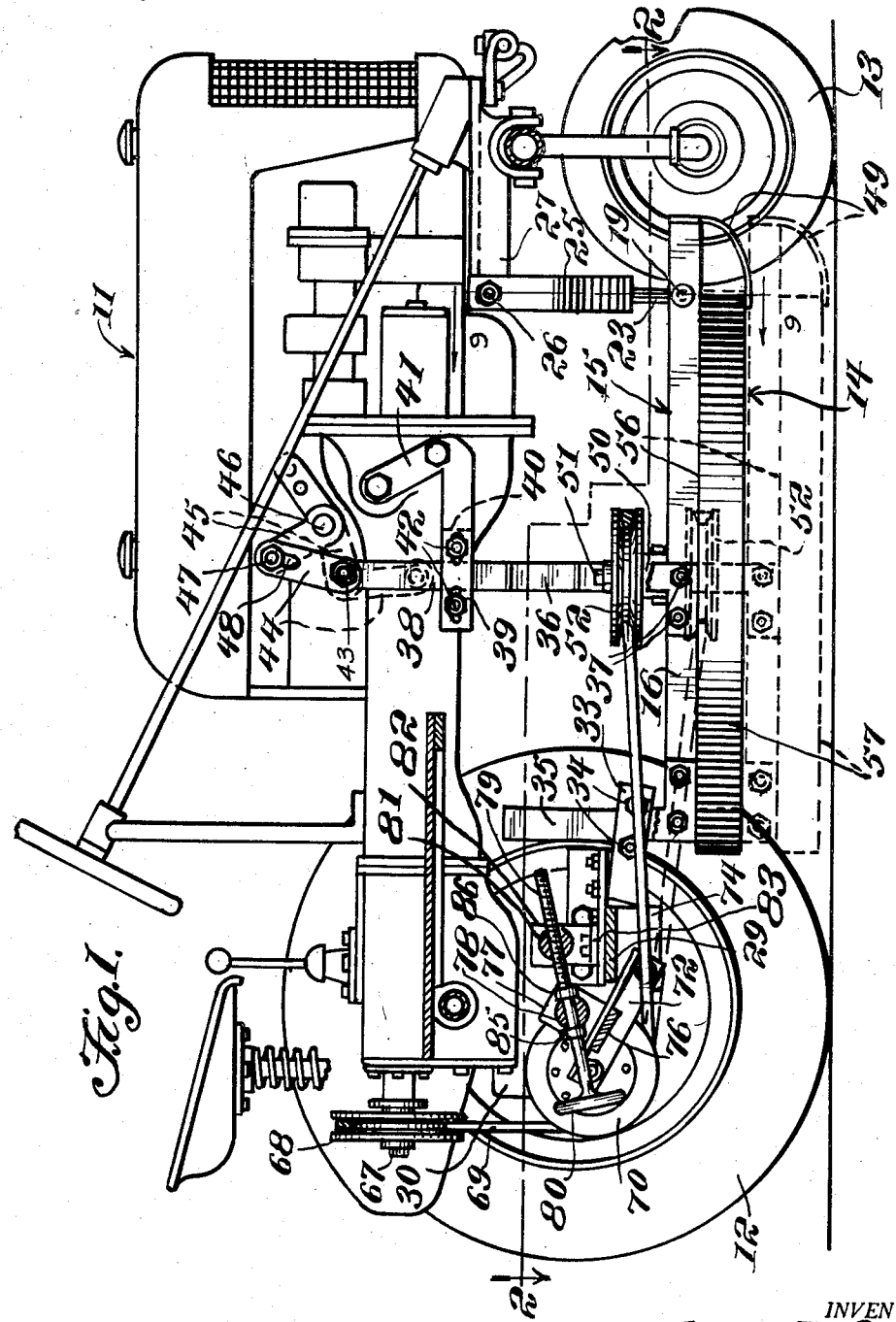
INVENTOR.
Owen D. Crump,
BY
McMorrow, Berman + Davidson
ATTORNEYS

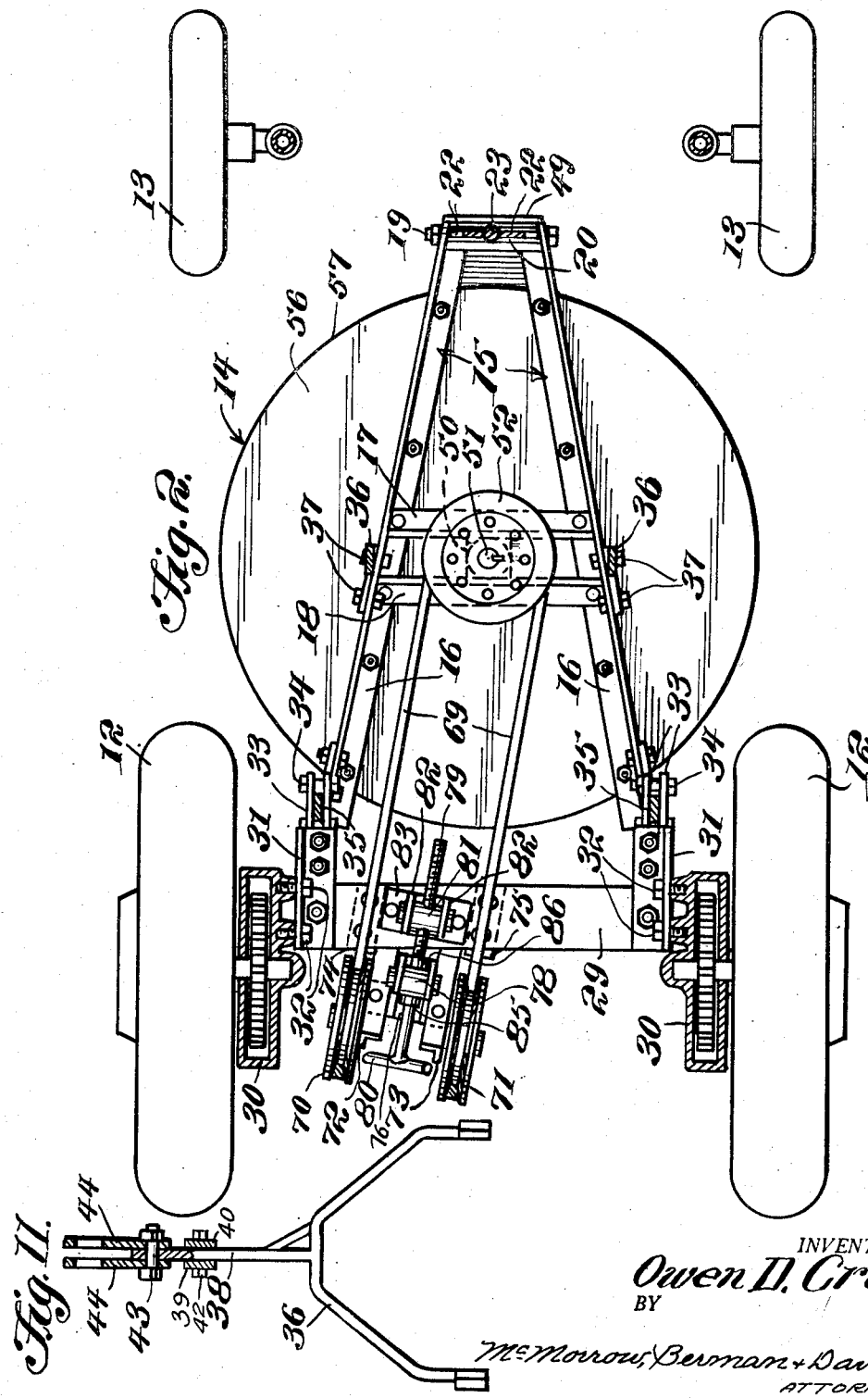

June 28, 1955
O. D. CRUMP
2,711,624
MOWING ATTACHMENT FOR A TRACTOR
Filed July 2, 1954
3 Sheets-Sheet 3
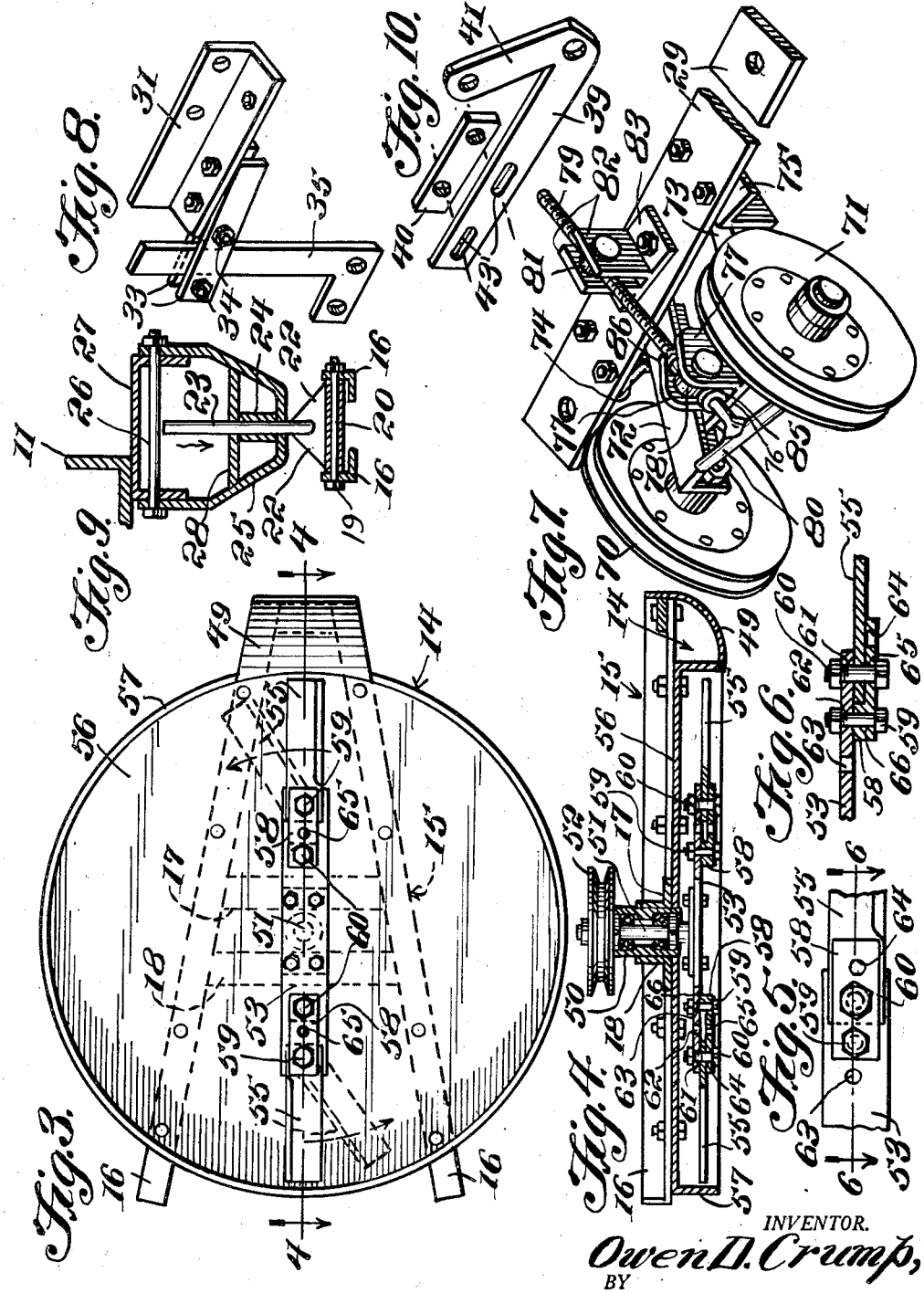
INVENTOR.
Owen D. Crump,
BY
McMorrow, Berman & Davidson
ATTORNEYS

United States Patent Office 2,711,624
Patented June 28, 1955

2,711,624

MOWING ATTACHMENT FOR A TRACTOR

Owen D. Crump, Olathe, Kans.

Application July 2, 1954, Serial No. 441,131

3 Claims. (Cl. 56—25.4)

This invention relates to agricultural implements, and more particularly to an improved mower attachment for a tractor.

The main object of the invention is to provide a novel and improved mowing attachment for a tractor, said attachment being simple in construction, being easy to install, and providing a smooth cutting action regardless of the irregularity of the terrain over which the device is employed.

A further object of the invention is to provide an improved mowing attachment for a tractor, said attachment involving inexpensive components, being durable in construction, providing a floating action which allows the device to be employed over relatively rough ground without damage to the parts and without requiring special adjustments thereof.

A further object of the invention is to provide an improved mowing attachment for a conventional tractor, said attachment being supported in a manner to allow the device to be employed on rough ground without damage thereto, the attachment being reliable in operation and being readily adjustable to provide a desired cutting height.

Further objects and advantages of the invention will become apparent from the following description and claims, and from the accompanying drawings, wherein:

Figure 1 is a vertical longitudinal cross sectional view taken through a conventional tractor provided with an improved mowing attachment constructed in accordance with the present invention.

Figure 2 is a horizontal cross sectional view taken on the line 2—2 of Figure 1.

Figure 3 is a bottom view of the cutter assembly of the mowing attachment of Figures 1 and 2.

Figure 4 is a vertical cross sectional view taken on the line 4—4 of Figure 3.

Figure 5 is an enlarged fragmentary plan detail view showing the manner of connecting a blade element to the cutter arm of the mowing attachment so as to provide a rigid connection between the blade element and the arm.

Figure 6 is a cross sectional view taken on the line 6—6 of Figure 5.

Figure 7 is an enlarged perspective view showing the belt idler supporting pulleys and the means for adjusting the belt tension, as employed in the mowing attachment of Figures 1 and 2.

Figure 8 is an enlarged perspective view showing one of the rear vertical guide brackets and the vertical guide arm associated therewith, as employed in the mowing attachment of Figures 1 and 2.

Figure 9 is a transverse vertical cross sectional detail view taken on the line 9—9 of Figure 1.

Figure 10 is a perspective view showing the guide brackets employed with the supporting arm of the main yoke member, employed to connect the mower attachment to the hydraulic lift assembly of a tractor, as employed in the arrangement of Figures 1 and 2.

Figure 11 is an elevational detail view, partly in vertical cross section, showing the transverse yoke member employed to support the intermediate portion of the mowing attachment and the means associated therewith for connecting the attachment to the hydraulic lift arm of the tractor, as employed in the arrangement illustrated in Figures 1 and 2.

Referring to the drawings, 11 designates a conventional farm tractor having the rear wheels 12 and the front wheels 13. Designated generally at 14 is a mowing attachment which comprises a frame 15 having the rearwardly divergent side bars 16, 16 which are connected at their intermediate portions by a pair of transverse bars 17 and 18 and which are connected at their forward ends by a transverse bolt 19, a spacer sleeve 20 being engaged on the bolt between the vertical flanges of the side bars 16, 16, as shown in Figure 9.

Rigidly secured to the sleeve 20 is the transversely extending triangular plate member 22 which projects upwardly and which has secured to its upper portion the substantially vertical, upwardly extending shaft element 23. The shaft element 23 is slidably received in a substantially vertical guide sleeve 24 secured in a U-shaped bracket member 25 which is pivotally connected by a transverse bolt 26 to the depending arms of an inverted U-shaped bracket member 27 rigidly secured to the bottom of the forward portion of the tractor frame, whereby the U-shaped bracket member 25 is pivotally connected for rotation around a horizontal transverse axis defined by the horizontal transverse bolt 26. As shown in Figure 9, the sleeve member 24 is secured between the bottom of the bracket 25 and a horizontally extending intermediate bar 28 secured in the bracket 25. The shaft member 23 extends through the sleeve 24 into the bracket, as is clearly shown in Figure 9, and is freely slidable in the sleeve 24.

Designated at 29 is a relatively wide transverse bar secured horizontally to the rear wheel gear housing members 30, 30, as by respective end angle brackets 31, 31 whose horizontal flanges are connected to the end portions of the bar 29 and whose vertical flanges are connected to the housing members 30, 30, as by the bolts 32, shown in Figure 2. As shown in Figure 2, the angle bars 31, 31 extend forwardly from the transverse bar member 29 and have secured thereto the longitudinally extending, spaced vertical plate elements 33, 33. Secured in the forward portions of the plate elements 33, 33 are the spaced transverse guide bolts 34, 34.

Rigidly secured to the rear ends of the respective frame side bars 16, 16, are the respective L-shaped vertical bracket members 35, 35 the vertical upstanding portions of the brackets 35 being slidably received between the plates 33, 33 and being received between the respective pairs of bolts 34, 34, as is clearly shown in Figure 8. Thus, the upstanding arm portions of the brackets 35, 35 are freely slidable vertically between the plate members 33, 33, and are freely movable longitudinally between the spaced bolts 34, 34, whereby the frame is free to swing horizontally through a limited distance determined by the spacing of bolts 34, 34.

Designated at 36 is a transverse yoke member having the ends of its arms connected at 37, 37 to respective transversely aligned intermediate portions of the side bars 16, 16, for example, between the horizontal cross bars 17 and 18, as shown in Figure 2. Rigidly secured to the top of the yoke member 36 is the substantially vertical, upstanding arm 38 which is slidably received between a pair of guide plates 39 and 40 secured to the frame of the tractor directly above the mower frame 15, the outer bracket 39 having the upwardly and rearwardly inclined forward arm 41 which is secured to the tractor frame, and the inner bracket 40 being secured to the horizontal portion of the bracket 39 by a pair of bolts 42, 42, said bolts extending through longitudinal slots 43', 43' in the lower portion of bracket 39, whereby the position of the yoke-supporting arm 38 may be adjusted relative to bracket 39.

Brackets 39 and 40, together with the bolts 42, 42, act as vertical guide means for the yoke-supporting arm 38 and serve to hold the arm 38 substantially vertical in different positions of vertical adjustment of the mower frame 15.

Pivotally connected to the top end of the arm 38, as by the pivot bolt 43, are the parallel link arms 44, 44, which receive between their upper portions the end of the hydraulic lift arm 45 which is secured to the hydraulic lift shaft 46 of the tractor. A connecting bolt 47 extends through slots 48 provided in the link arms 44, 44 and through the hydraulic lift arm 45, connecting the link arms 44, 44 to the lift arm 45 and providing a pivotal and sliding connection between the hydraulic lift arm 45 and the link bars 44, 44, allowing the mower assembly to be at times elevated freely without damage to any parts, as when unyielding obstacles, such as stones or the like are encountered by the mower in the course of its travel.

Secured to the forward end of the frame 15 is an arcuately curved skid shoe 49 which is outwardly convex, as is clearly shown in Figure 4, and which acts to cause the mower assembly to be elevated when relatively immovable obstacles, such as stones or the like are encountered.

As shown in Figure 2, the transverse connecting bars 17 and 18 are arranged with their vertical flanges inwardly opposed to each other. Secured between said flanges substantially at the mid point of the transverse connecting members 17 and 18 is the vertical bearing 50 in which is journaled the cutter shaft 51. Secured to the top end of the shaft 51 is the cutter pulley 52. Secured to the lower end of shaft 51 is the rigid cutter arm 53, said cutter arm being secured at its intermediate portion to the bottom end of the cutter shaft 51, as shown in Fig. 4. Designated at 55, 55 are respective cutter blades which are secured to the outer ends of the cutter arm 53 in a manner presently to be described.

Designated at 56 is a circular guard plate secured to the frame 15 concentrically with the shaft 51 and overlying the cutter arm 53 and blade 55, as shown in Figures 3 and 4. The circular guard plate 56 has a depending peripheral flange 57 which extends downwardly a short distance below the horizontal plane of the blade elements 55, 55, as is clearly shown in Figure 4.

The blade elements 55, 55 may be secured either rigidly to the ends of the cutter arm 53, or may be pivotally secured for free rotation with respect to said ends. Designated at 58, 58 are respective shouldered brackets which are employed in conjunction with respective pairs of fastening bolts 59 and 60 to secure the cutter blade elements 55 to the ends of the arms in either a rigid manner or a pivotal manner, as above described. As shown in Figure 6, each end portion of the cutter arm 53 is provided with the three evenly spaced openings 61, 62 and 63. Each bracket 58 is provided with three evenly spaced openings 64, 65 and 66, having the same spacing as the apertures 61, 62 and 63. The aperture 66 is located in the shouldered portion of the bracket. As shown in Figure 6, the blade element 55 may be rigidly secured to the cutter arm by employing the respective aligned pairs of apertures 62, 66 and 61, 65 to receive the fastening bolts 59 and 60, whereby the end of the blade element 55, which is rectangular in shape, abuts against the shoulder of the bracket 58, holding the blade element 55 rigidly and preventing rotation thereof with respect to the cutter arm 53. If it is desired to allow the blade elements 55 to rotate freely with respect to the cutter arm 53, the respective aligned pairs of apertures 61, 64 and 63, 66 are employed to receive the connecting bolts 59 and 60, as shown in Figure 4, whereby the blade elements 55 are free to rotate with respect to the associated ends of the cutter arm 53.

Rigidly secured on the power takeoff shaft 67 of the tractor is the drive pulley 68. Drive pulley 68 is coupled by a belt 69 to the horizontal cutter shaft pulley 52, the belt 69 extending over a pair of idler pulleys 70 and 71 which are suitably journaled and which are arranged in suitable vertical planes extending parallel to each other, as shown in Figure 2. The idler pulleys 70 and 71 are journaled on the ends of respective parallel angle bars 72 and 73 whose forward ends are pivotally connected to respective angle brackets 74 and 75 secured to the under side of the transverse bar member 29. The rear portions of the angle bars 72 and 73 are connected by a transverse bar member 76 on which is secured the spaced parallel upstanding lugs 77, 77. Pivoted between said lugs is a thrust bearing member 78, as shown in Figure 7, through which extends the belt tightening screw 79, said screw 79 being rotatably engaged with the bearing member 78 adjacent its rear end portion, said rear end portion being provided with the transversely extending handle 80. The forward end portion of the screw 79 is threadedly engaged with a transversely extending short shaft element 81 which is rotatably supported between a pair of upstanding lugs 82, 82 rigidly mounted on a bracket member 83 secured on the intermediate portion of the plate member 29. It will be apparent that by rotating the screw member 79, as by means of the handle 80, that the movement of the screw through the transverse shaft element 81 causes the angle bars 72 and 73 to pivot relative to their brackets 74 and 75, and therefore causes the idler pulleys 70 and 71 to loosen or tighten the drive belt 69.

As shown in Figure 1, the screw 79 is rotatably secured relative to the bearing member 78, as by the provision of the abutment collars 85 and 86 on the screw member 79 disposed on the opposite sides of the transverse bearing member 78.

In operation, the cutter shaft 51 is driven from the power takeoff shaft of the tractor by the belt 69, as above described, causing the cutter arm 53 and the blade element 55 to be rotated and to perform the required mowing operation. The mower assembly may be adjusted to a desired height by means of the hydraulic lift apparatus of the tractor. The forward guide means comprising the forward guide shaft 23 engaged in the sleeve 24, which in turn is mounted on the swingable bracket member 25, together with the rear guide means comprising the upstanding bracket elements 35 and their associated guides, allows the cutter assembly to yield freely in response to irregularities in the ground being mowed and provides a desirable floating action for the assembly.

As above explained, when objects such as large stones or the like are encountered, the skid member 49 causes the mower frame and parts carried thereby to be elevated as the mower assembly passes over the objects, preventing damage to the apparatus.

While a specific embodiment of an improved mowing attachment for a tractor has been disclosed in the foregoing descriptions, it will be understood that various modifications within the spirit of the inventon may occur to those skilled in the art. Therefore, it is intended that no limitations be placed on the invention except as defined by the scope of the appended claims.

What is claimed is:

1. A mowing attachment for a tractor comprising a frame adapted to be disposed beneath the tractor, a transverse yoke member secured to the intermediate portion of said frame, an upstanding arm at the top portion of said yoke member, link means connecting said arm to the hydraulic lift shaft of the tractor, an upstanding shaft element pivotally connected to the forward portion of said frame for rotation around a horizontal transverse axis, an upstanding guide sleeve pivotally connected to the tractor for rotation on an axis parallel to the axis of rotation of said shaft element and slidably receiving said shaft element, upstanding guide means on the rear portion of said frame, guide bracket means on the tractor slidably receiving said last-named guide means, a vertical shaft journaled on said frame, horizontal cutter blade means secured to the lower end of said shaft, and means drivingly coupling said shaft to the power takeoff shaft of the tractor.

2. A mowing attachment for a tractor comprising a frame adapted to be disposed beneath the tractor, a transverse yoke member secured to the intermediate portion of said frame, an upstanding arm at the top portion of said yoke member, link means connecting said arm to the hydraulic lift shaft of the tractor, an upstanding shaft element pivotally connected to the forward portion of said frame for rotation around a horizontal transverse axis, an upstanding sleeve pivotally connected to the tractor for rotation on an axis parallel to the axis of rotation of said shaft element and slidably receiving said shaft element, upstanding guide means on the rear portion of said frame, guide bracket means on the tractor slidably receiving said last-named guide means, a vertical shaft journaled on said frame, horizontal cutter blade means secured to the lower end of said shaft, a horizontal circular guard plate secured to said frame around said shaft and overlying said cutter blade means, and means drivingly coupling said shaft to the power takeoff shaft of the tractor.

3. A mowing attachment for a tractor comprising a frame adapted to be disposed beneath the tractor, a transverse yoke member secured to the intermediate portion of said frame, an upstanding arm at the top portion of said yoke member, link means connecting said arm to the hydraulic lift shaft of the tractor, an upstanding shaft element pivotally connected to the forward portion of said frame for rotation around a horizontal transverse axis, an upstanding sleeve pivotally connected to the tractor for rotation on an axis parallel to the axis of rotation of said shaft element and slidably receiving said shaft element, upstanding guide means on the rear portion of said frame, guide bracket means on the tractor slidably receiving said last-named guide means, a vertical shaft journaled on said frame, horizontal cutter blade means secured to the lower end of said shaft, an arcuately curved skid shoe on the under part of the forward portion of said frame, and means drivingly coupling said shaft to the power take-off shaft of the tractor.

References Cited in the file of this patent

UNITED STATES PATENTS

| | | |
|---|---|---|
| 2,229,363 | Bishop | Jan. 21, 1941 |
| 2,344,663 | Wood | Mar. 21, 1944 |
| 2,530,041 | Bennett | Nov. 14, 1950 |
| 2,576,886 | McCoy | Nov. 27, 1951 |